US011999265B1

(12) United States Patent
Yoo et al.

(10) Patent No.: US 11,999,265 B1
(45) Date of Patent: Jun. 4, 2024

(54) REGENERATIVE BRAKING POWER GENERATION SYSTEM FOR TRAILERS

(71) Applicant: SANGSIN BRAKE CO., LTD., Daegu (KR)

(72) Inventors: Chang Hee Yoo, Dae (KR); Jung Gyu Hwang, Daeg (KR); Sun Man Gwon, D (KR); Hyun Jong Cho, Daegu (KR)

(73) Assignee: SANGSIN BRAKE CO., LTD., Daegu (KR)

( * ) Notice: Subject to any disclaimer, the term of this patent is extended or adjusted under 35 U.S.C. 154(b) by 0 days.

(21) Appl. No.: 17/772,954

(22) PCT Filed: Mar. 31, 2022

(86) PCT No.: PCT/KR2022/004589
§ 371 (c)(1),
(2) Date: Apr. 28, 2022

(87) PCT Pub. No.: WO2023/128064
PCT Pub. Date: Jul. 6, 2023

(30) Foreign Application Priority Data

Dec. 30, 2021 (KR) .................. 10-2021-0192003

(51) Int. Cl.
*B60L 7/26* (2006.01)
*B60L 7/16* (2006.01)
(Continued)

(52) U.S. Cl.
CPC ............... *B60L 7/16* (2013.01); *B60T 13/74* (2013.01); *H02P 3/14* (2013.01); *B60T 2270/60* (2013.01)

(58) Field of Classification Search
CPC ............. B60L 7/16; B60T 13/74; H02P 3/14
See application file for complete search history.

(56) References Cited

U.S. PATENT DOCUMENTS

2003/0189380 A1 10/2003 Ishikawa
2021/0170878 A1* 6/2021 Straßer .................... B60L 7/26

FOREIGN PATENT DOCUMENTS

KR 20-0404456 Y1 12/2005
KR 10-2010-0119704 A1 11/2010
(Continued)

*Primary Examiner* — Muhammad S Islam
(74) *Attorney, Agent, or Firm* — PARK LAW FIRM (57) ABSTRACT

Disclosed is a regenerative braking power generation system for trailers configured such that a generator is installed in a brake disc space portion of a trailer to self-generate electricity necessary for the trailer, wherein the regenerative braking power generation system includes at least one axle (3) fixed to a chassis (2) of a trailer, a wheel hub (5) and/or a brake disc (6) axially installed at an outer surface of the axle (3) via a plurality of bearings (4) so as to be passively rotated, a space portion (7) concavely formed in one side surface of the brake disc (6), a permanent magnet (8) fixed to an inner circumferential surface of the space portion (7) in tight contact therewith, the permanent magnet being configured to be rotated along with the brake disc (6), and a generator stator (9) fixed to an outer circumferential surface of the axle (3) corresponding to the permanent magnet (8). AC power produced by the generator (10) is converted into DC power by a rectification unit (20) constituted by a plurality of full-wave diodes (D1, D2, D3, D4, D5, and D6) and a smoothing capacitor (C), a rechargeable battery (secondary battery) or a battery (40) is charged with the DC power by a charge controller (30), the DC power is supplied to a DC (direct current) load (50), and the power in the battery (40) is converted into AC power of 50 to 60 Hz by an inverter (60) and is supplied to an AC (alternating current) load (70).

5 Claims, 8 Drawing Sheets

(51) Int. Cl.
*B60T 13/74* (2006.01)
*H02P 3/14* (2006.01)

(56) References Cited

FOREIGN PATENT DOCUMENTS

KR 10-1582754 B1 1/2016
KR 10-2019-0021891 A 3/2019

* cited by examiner

REGENERATIVE BRAKING POWER GENERATION SYSTEM FOR TRAILERS

TECHNICAL FIELD

The present invention relates to a regenerative braking power generation system for trailers configured such that a generator is installed in a brake disc space portion of a trailer to self-generate electricity necessary for the trailer.

BACKGROUND ART

In general, a trailer, which is a vehicle connected to a tractor (a tow truck or a towing means) to carry baggage or people without power, is mainly classified as a commercial trailer or a camping trailer. The commercial trailer requires power (electrical energy) necessary for an indoor light, a tailgate, refrigeration, etc., and the camping trailer requires power necessary for indoor and outdoor lights and electric home appliances, such as a TV and a refrigerator.

At present, a trailer receives necessary power from a battery of a tractor (the tow truck) or uses electrical energy produced by a diesel generator separately installed in the trailer as power.

In the case in which battery power is received from the tractor, it is necessary to modify a part of the tractor when a separate power supply cable is wired and installed. In the case in which the diesel generator separately installed in the trailer is used, it is necessary to frequently inject, store, and maintain diesel fuel and a lubricant. In addition, there are various restrictions and limitations in installation and operation of the diesel generator due to the limited inner space of the trailer. Furthermore, noise and noxious gas are generated when the diesel generator is operated.

DISCLOSURE

Technical Problem

It is an object of the present invention to provide a regenerative braking power generation system for trailers configured such that a generator is installed in a brake disc space portion of a trailer to self-generate electricity necessary for the trailer.

Technical Solution

A regenerative braking power generation system for trailers according to the present invention includes at least one axle fixed to a chassis of a trailer, a wheel hub and a brake disc axially installed at an outer surface of the axle via a plurality of bearings so as to be passively rotated, and a generator installed in a space portion concavely formed in one side surface of the brake disc, wherein the generator includes a ring-shaped rotor fixed to an inner circumferential surface of the space portion of the brake disc in tight contact therewith, the rotor having a plurality of permanent magnets disposed (arranged) thereon at equal intervals and a stator fixed to an outer circumferential surface of the axle corresponding to the rotor, the stator being constituted by a stator coil.

The generator may be a permanent magnet synchronous generator (PMSG).

The stator coil may extend into the trailer via the interior or the exterior of a through-hole formed in a longitudinal direction of the axle.

AC power produced by the generator may be converted into DC power by a rectification unit, a battery may be charged with the DC power by a charge controller, the DC power may be supplied to a DC load, and the power in the battery may be converted into AC power by an inverter and may be supplied to an AC load.

The inverter may simultaneously or selectively convert and output three-phase AC power and single-phase AC power.

Advantageous Effects

The present invention has an effect in that a self-generation system in which a generator (10) is installed in a residual space portion (7) provided at a brake disc (6) of a trailer to directly supply necessary electrical energy to the trailer is adopted, whereby it is possible to solve power-related problems with a conventional trailer.

The present invention has an effect in that AC power produced by the generator (10) is converted into DC power by a rectification unit (20), a battery (40) is charged with the DC power by a charge controller (30), and the DC power is supplied to a DC load (50), and in that the power in the battery (40) is converted into AC power by an inverter (60) and is individually or selectively supplied to an AC load (70).

The present invention has an effect in that, since a self-generation system installed in a residual space of the trailer is adopted, space utilization is excellent, and separate wiring for receiving power from a tractor is unnecessary, and in that, since a regenerative braking system is adopted, a diesel generator is unnecessary, whereby noise and noxious gas due to installation and operation of the diesel generator are not generated, and therefore maintenance expenses are greatly reduced. Consequently, the present invention is a very useful invention.

BEST MODE

Hereinafter, preferred embodiments of the present invention will be described in detail with reference to the accompanying drawings. In describing the embodiments of the present invention, the same components in the drawings are denoted by the same reference symbols wherever possible, and a detailed description of known configurations and functions related thereto will be omitted when it may obscure the subject matter of the present invention.

In addition, matters expressed in the accompanying drawings are schematized in order to easily describe the embodiments of the present invention, and may be different from actually implemented forms.

Figure 1:
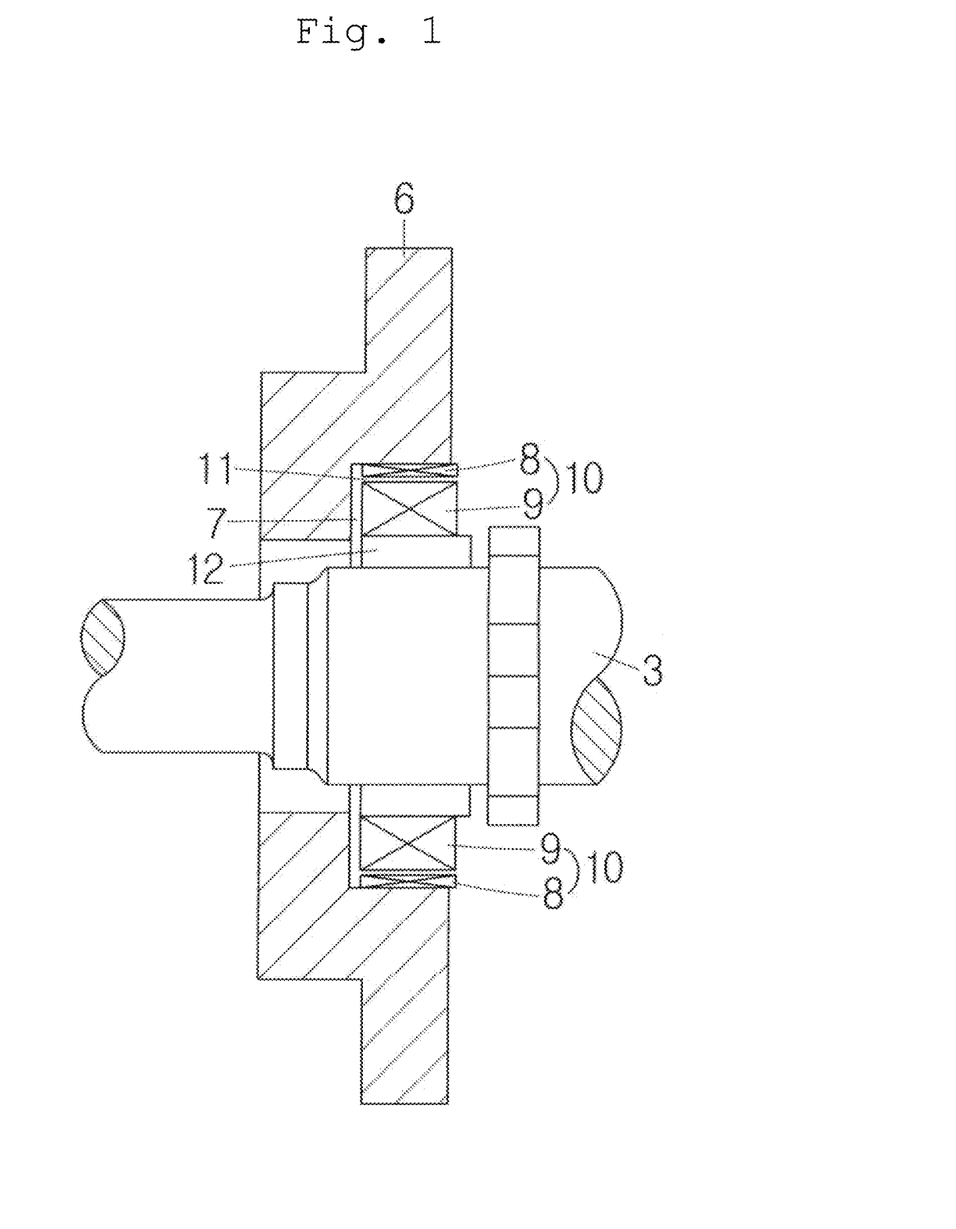
FIG. 1 is a view showing the construction of a regenerative braking power generation system as an example of the present invention.
Figure 2:
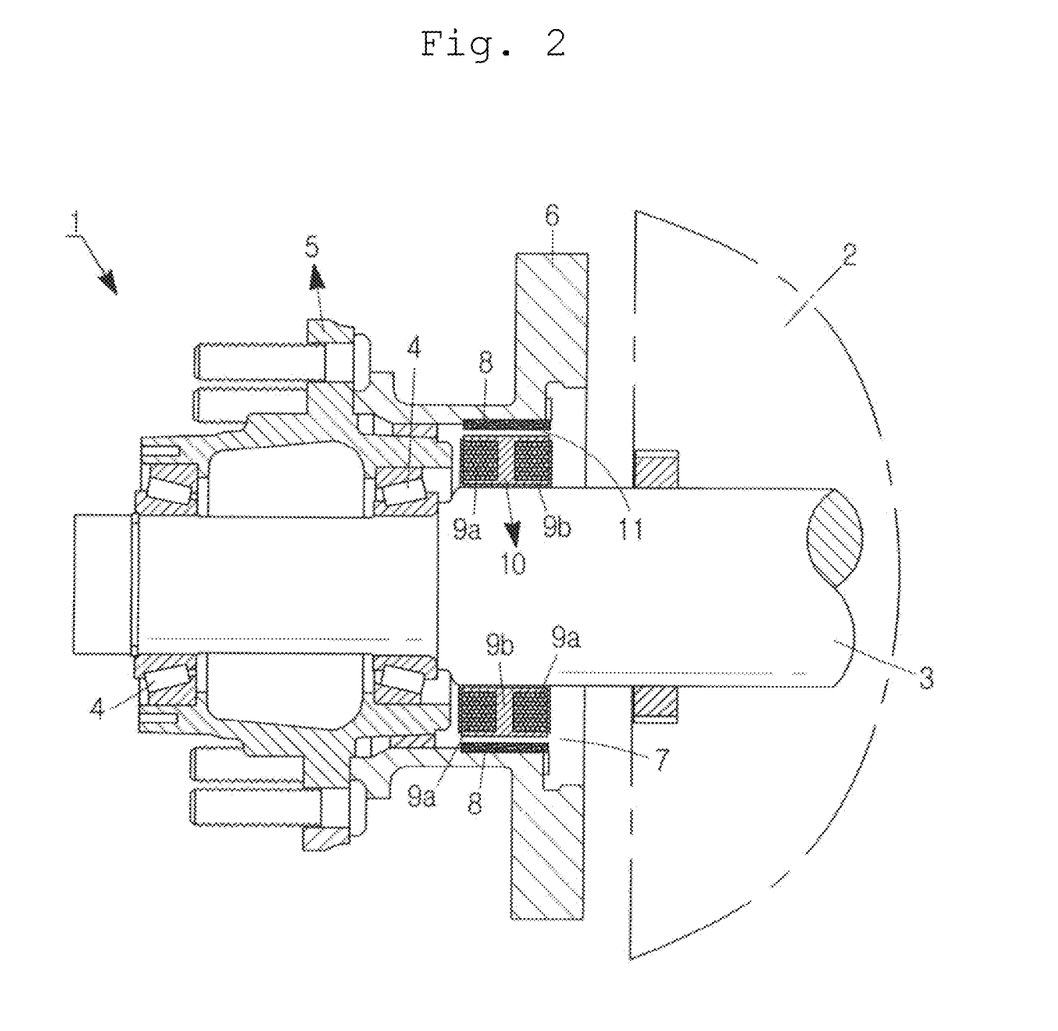
FIG. 2 is a sectional view showing the state in which a generator is installed in a residual space portion formed at a brake disc of a trailer in the present invention.

A regenerative braking power generation system 1 for trailers disclosed by the present invention includes at least one axle 3 fixed to a chassis 2 of a trailer, a wheel hub 5 and a brake disc 6 axially installed at an outer surface of the axle 3 via a plurality of bearings 4 so as to be passively rotated, and a regenerative braking type generator 10 installed in a space portion 7 concavely formed in one side surface of the brake disc 6, wherein the generator 10 includes a ring-shaped rotor fixed to an inner circumferential surface of the space portion 7 of the brake disc 6 in tight contact therewith, the rotor having a plurality of permanent magnets 8 disposed or arranged thereon at equal intervals, and a stator 9 fixed to an outer circumferential surface of the axle 3 corresponding to the rotor, the stator having a core 9*b* on which a stator coil 9*a* is wound, and a gap 11 having a predetermined interval is formed between the rotor and the stator such that the rotor and the stator are adjacent to each other but do not contact each other.

Figure 3:
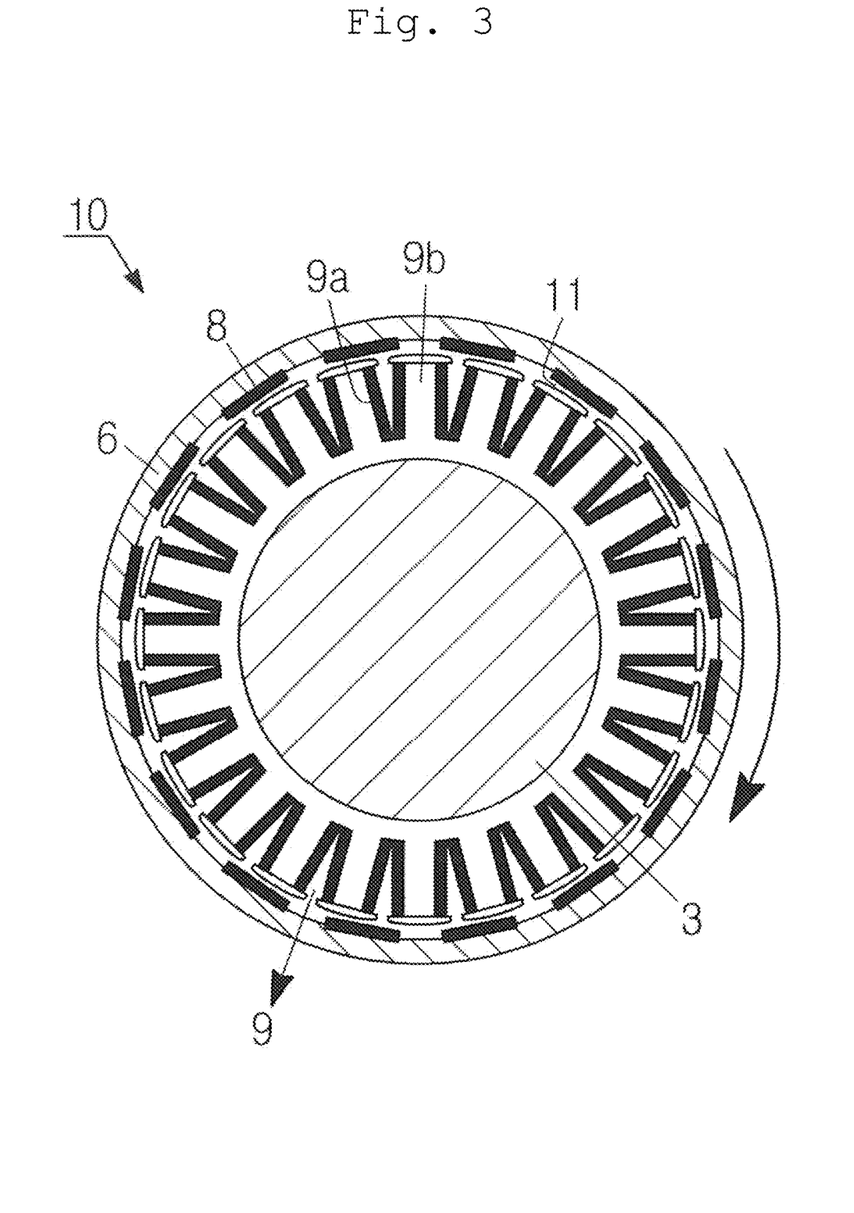
FIG. 3 is a view showing the construction of a permanent magnet synchronous generator (PMSG) as an example of the present invention.

In the space portion 7 of the brake disc 6, the plurality of permanent magnets 8 is installed in a ring shape to generate a rotating magnetic field while being rotated, and the rotating magnetic field is linked to the stator 9 constituted by the core 9*b*, which is fixed to the outer circumferential surface of the axle 3 in a state of being fitted therein so as to correspond to the plurality of permanent magnets 8, and the stator coil 9*a*, whereby voltage is generated, and therefore regenerative braking electricity generation is performed.

FIG. 2 is a view showing the construction of a regenerative braking power generation system 1 for trailers according to the present invention, wherein the regenerative braking power generation system includes at least one axle 3 fixed to a chassis 2 of a trailer, a wheel hub 5 and/or a brake disc 6 axially installed at an outer surface of the axle 3 via a plurality of bearings 4 so as to be passively rotated, a space portion 7 concavely formed in one side surface of the brake disc 6, a permanent magnet 8 fixed to an inner circumferential surface of the space portion 7 in tight contact therewith, the permanent magnet being configured to be rotated along with the brake disc 6, and a stator 9 of a generator 10 fixed to an outer circumferential surface of the axle 3 corresponding to the permanent magnet 8 or a stator 9 of a generator 10 fixed to an outer circumferential surface of a bracket 12 fixed to an outer circumferential surface of the axle 3, as shown in FIG. 1.

The permanent magnet 8 corresponds to a rotor configured to be rotated along with the wheel hub and the brake disc 6, and the stator 9 corresponds to a stator installed at the axle 3 of the trailer.

The permanent magnet 8 has a ring shape in which a plurality of permanent magnets is disposed at equal intervals, and the stator 9 is configured such that three stator coils 9*a* are wound around a core 9*b* formed by stacking a plurality of thin iron plates. One-phase current is induced for each of the three stator coils 9*a*, and therefore three-phase current is induced. The stator coils 9*a* may be wired using a Y wiring method having high line voltage.

The stator coils 9*a* may extend into the trailer via the interior or the exterior of a through-hole formed in a longitudinal direction of the axle 3.

The generator 10 may be a permanent magnet synchronous generator.

The generator 10 may also be a brushless synchronous generator.

The permanent magnet synchronous generator (PMSG) has merits in that permanent magnets are used, whereby efficiency is about 90% higher than a general induction generator, the size and weight of the generator can be reduced, and there are no gears, whereby low-speed operation is possible.

A gap 11 is provided between the permanent magnet 8 and the stator 9 such that the permanent magnet and the stator are adjacent to each other but do not rub against each other.

Figure 4:
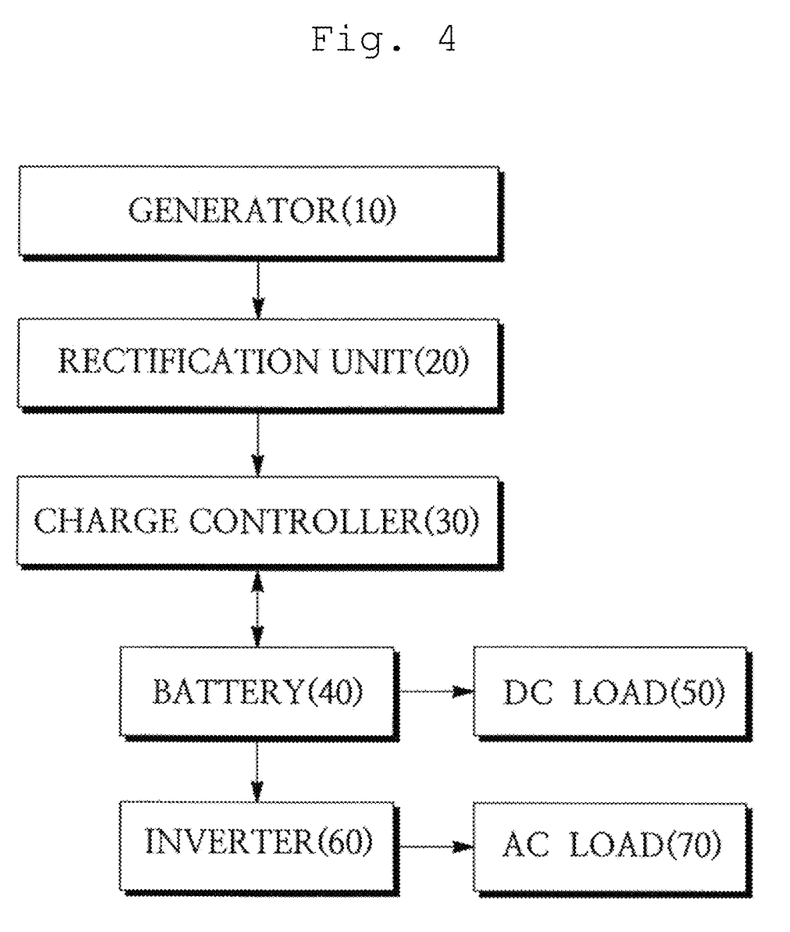
FIG. 4 is a circuit block diagram shown as an example of the present invention.

FIG. 4 is a circuit block diagram shown as an example of the present invention, wherein AC power produced by the generator 10 is converted into DC power by a rectification unit 20 constituted by a plurality of full-wave diodes D1, D2, D3, D4, D5, and D6 and a smoothing capacitor C, a rechargeable battery (secondary battery) or a battery 40 is charged with the DC power by a charge controller 30, the DC power is supplied to a DC (direct current) load 50, and the power in the battery 40 is converted into AC power of 50 to 60 Hz by an inverter 60 and is supplied to an AC (alternating current) load 70.

The charge controller 30 includes a phase voltage unit and/or a phase current unit. Of course, the phase voltage unit and the phase current unit may be connected between the generator 10 and the charge controller 30 in order to stabilize generated power.

The inverter 60 may simultaneously or selectively convert and output three-phase AC power and single-phase AC power.

A terminal or an outlet configured to allow two or more loads to be connected thereto may be provided at an output of each of the battery 40 and the inverter 60, whereby at least two AC loads 70 and DC loads 50 may be connected so as to be used.

Figure 5:
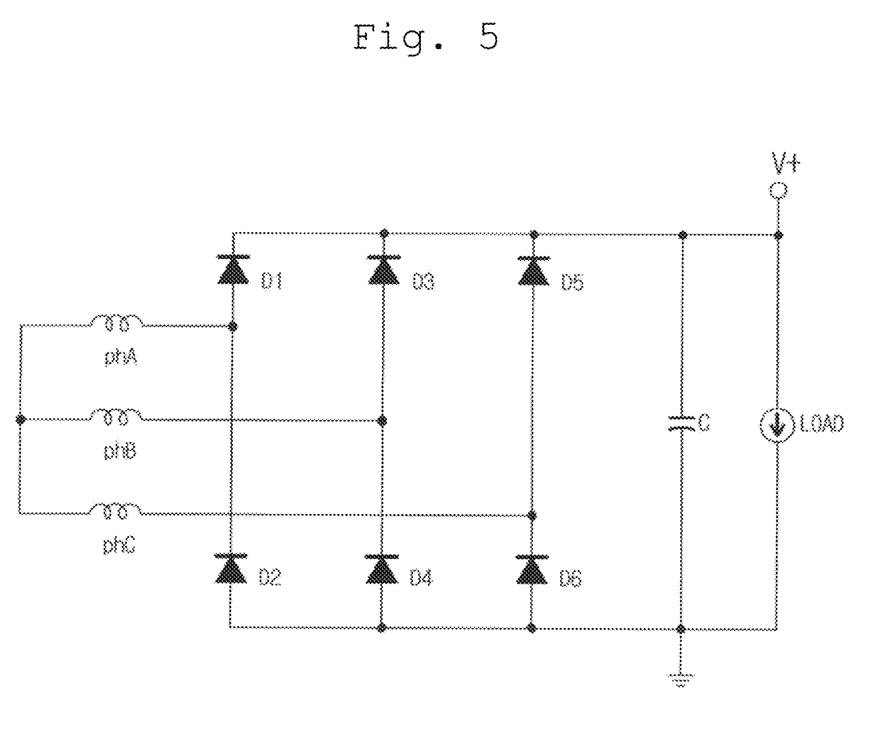
FIG. 5 is a circuit diagram of a generator and a rectification unit shown as an example of the present invention.

As shown in FIG. 5, three-phase AC power output from the three-phase stator coils phA, phB, and phC of the generator 10 according to the present invention is rectified by the plurality of full-wave diodes D1, D2, D3, D4, D5, and D6, is smoothed into direct current (V+) by the capacitor C, and the direct current is output to drive a direct current load LOAD connected to the output.

Phase voltage, phase current, and output voltage of the generator 10 may be set based on the rotating speed of the brake disc 6 (or the rotating speed of a magnetic field), the intensity thereof, and the number of turns of the stator coils 9*a*.

Figure 6:
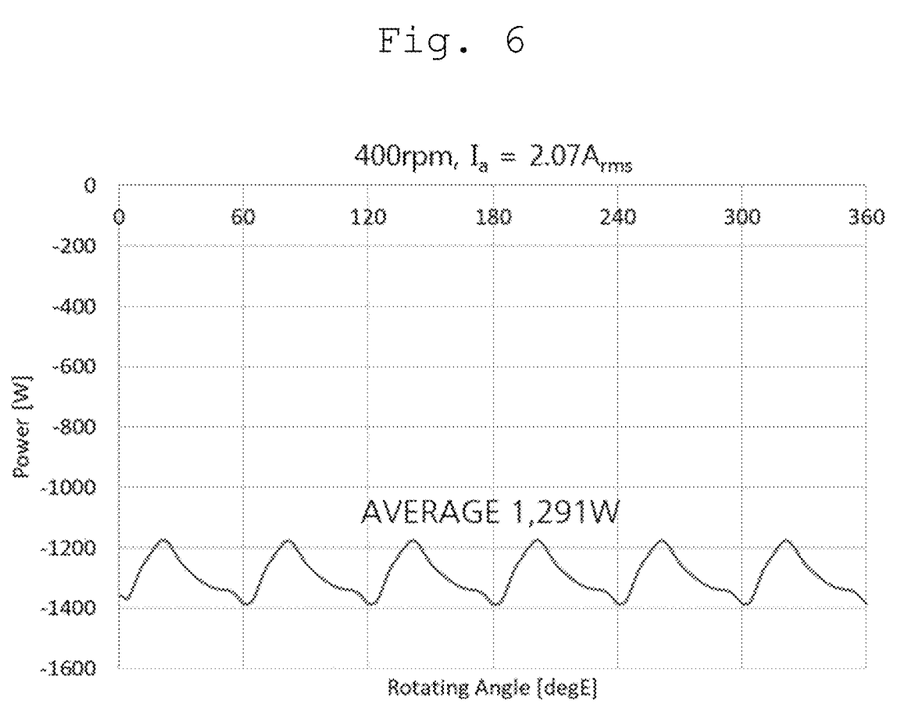
FIG. 6 is a power output graph of the generator shown as an example of the present invention.
Figure 7:
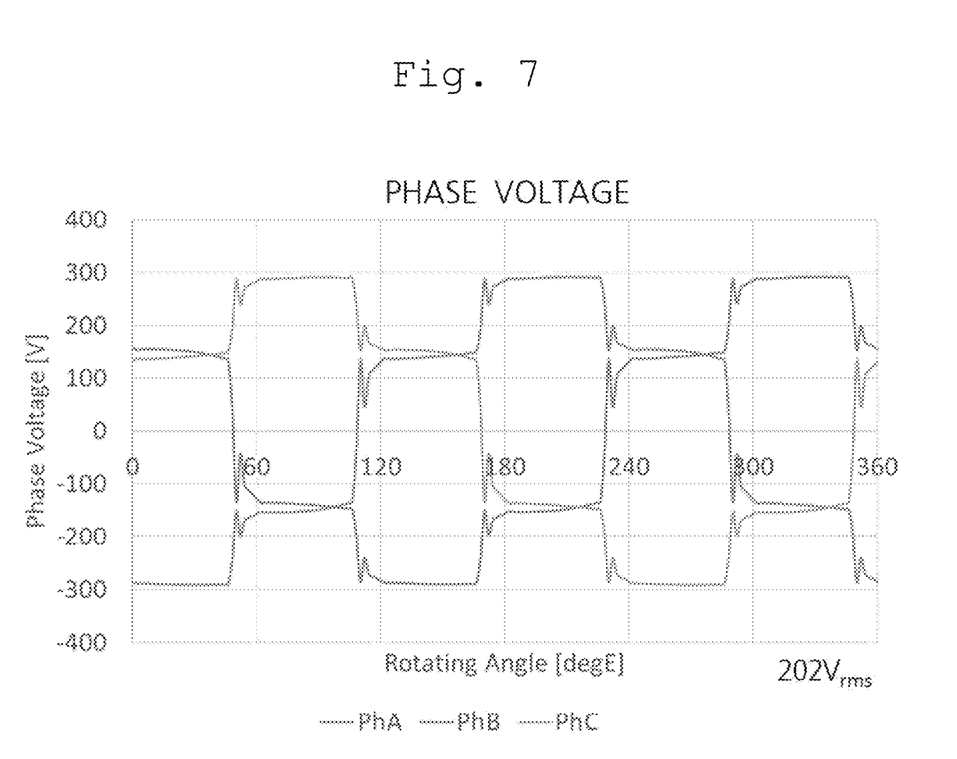
FIG. 7 is a phase voltage graph of the generator shown as an example of the present invention.
Figure 8:
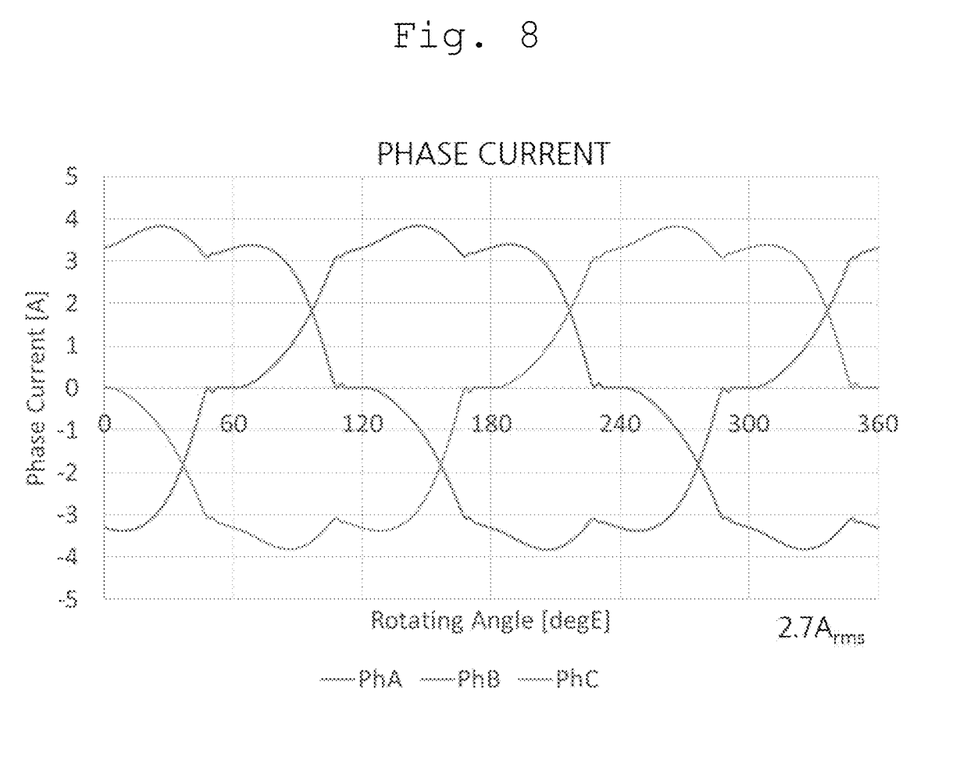
FIG. 8 is a phase current graph of the generator shown as an example of the present invention.

FIG. 6 is an example graph showing that an average power of 1,291 W is obtained when the rotating speed of the generator 10, e.g. the rotating speed of the brake disc 6, is 400 rpm, FIG. 7 is an example graph showing that a phase voltage of 202 V is obtained through the generator 10, and FIG. 8 is an example graph showing that a phase current of 2.7 A is obtained through the generator 10.

In the present invention, when the trailer is towed by a tractor (a tow truck or a towing means), wheels and the wheel hub 5 are rotated, the brake disc 6 fixed to the wheel hub 5 is rotated in an interlocked state, and the permanent magnets 8 installed in the space portion 7 are also rotated to generate a rotating magnetic field. The rotating magnetic field (magnetic flux) is induced to the stator coils 9*a*, whereby voltage is generated, and therefore regenerative braking electricity generation is performed. AC power produced by the generator 10 is converted into DC power by the rectification unit 20, the battery 40 is continuously charged with the DC power by the charge controller 30, and the DC power is supplied to a plurality of DC loads 50 of the trailer, or the power is supplied to a plurality of AC loads 70 through the inverter 60 so as to be used thereby.

In the present invention, it is preferable for the generator 10 to be installed in each of residual space portions 7 of one or more brake discs 6 installed in the trailer such that multiple electricity generation is performed.

The present invention described above is not limited to the embodiments and the accompanying drawings, and various substitutions, medications, and alternations are possible without departing from the technical idea of the present invention, which is obvious to a person having ordinary skill in the art to which the present invention pertains.

The invention claimed is:

1. A regenerative braking power generation system for trailers, the regenerative braking power generation system comprising:
   at least one axle fixed to a chassis of a trailer;
   a wheel hub and a brake disc axially installed at an outer surface of the axle via a plurality of bearings so as to be passively rotated; and
   a generator installed in a space portion concavely formed in one side surface of the brake disc, wherein the generator comprises:
   a ring-shaped rotor fixed to an inner circumferential surface of the space portion of the brake disc in tight contact therewith, the rotor having a plurality of permanent magnets disposed thereon at equal intervals; and
   a stator fixed to an outer circumferential surface of the axle corresponding to the rotor, the stator being constituted by a stator coil.

2. The regenerative braking power generation system according to claim 1, wherein the generator is a permanent magnet synchronous generator.

3. The regenerative braking power generation system according to claim 1, wherein the stator coil extends into the trailer via the axle.

4. The regenerative braking power generation system according to claim 1, wherein
   AC power produced by the generator is converted into DC power by a rectification unit, a battery is charged with the DC power by a charge controller, and the DC power is supplied to a DC load, and
   the power in the battery is converted into AC power by an inverter and is supplied to an AC load.

5. The regenerative braking power generation system according to claim 4, wherein the inverter simultaneously or selectively converts and outputs three-phase AC power and single-phase AC power.

\* \* \* \* \*